United States Patent
Sarangdhar et al.

(10) Patent No.: US 9,946,433 B2
(45) Date of Patent: Apr. 17, 2018

(54) USER INTERFACE DESIGNING

(71) Applicant: TATA CONSULTANCY SERVICES LIMITED, Mumbai (IN)

(72) Inventors: Aniket Mohan Sarangdhar, Mumbai (IN); Prachi Sakhardande, Mumbai (IN); Rajiv Thanawala, Mumbai (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 547 days.

(21) Appl. No.: 14/603,887

(22) Filed: Jan. 23, 2015

(65) Prior Publication Data
US 2015/0363090 A1 Dec. 17, 2015

(30) Foreign Application Priority Data
Jun. 11, 2014 (IN) .......................... 1906/MUM/2014

(51) Int. Cl.
G06F 15/00 (2006.01)
G06F 13/00 (2006.01)
G06F 3/0481 (2013.01)
G06F 9/44 (2018.01)

(52) U.S. Cl.
CPC .............. *G06F 3/0481* (2013.01); *G06F 8/38* (2013.01)

(58) Field of Classification Search
CPC ....................................................... G06F 3/0484
USPC ................... 715/762, 764, 851, 853, 741
See application file for complete search history.

(56) References Cited

U.S. PATENT DOCUMENTS

2011/0196801 A1* 8/2011 Ellis .................. G06F 17/30654
   705/321
2015/0294377 A1* 10/2015 Chow ................ G06Q 30/0263
   705/347

FOREIGN PATENT DOCUMENTS

EP        1939749        7/2008

* cited by examiner

*Primary Examiner* — Kevin Nguyen
(74) *Attorney, Agent, or Firm* — Workman Nydegger (57) ABSTRACT

A method for designing a user interface (UI) for an application includes receiving, from a user, a first response comprising user selected first answers and a second response comprising user selected second answers, to pre-defined questions. The method includes assigning significance to interface (STI) weightage to each user selected first answer with respect to pre-defined user experience parameters and assigning a significance to business (STB) weightage to each user selected second answer. Also, the method includes computing total actual effective weightage for each pre-defined user experience parameter based on STI weightages of user selected first answers and STB weightages of user selected second answers. The method further includes calculating total maximum effective weightage for each pre-defined user experience parameter based on maximum STI weightage and maximum STB weightage for each pre-defined question. Furthermore, the method includes determining applicability index for each pre-defined user experience parameter for designing the UI.

20 Claims, 3 Drawing Sheets

USER INTERFACE DESIGNING

CROSS-REFERENCE TO RELATED APPLICATION

This application claims priority to and the benefit of Indian Patent Application No. 1906/MUM/2014, entitled "User Interface Designing" filed on Jun. 11, 2014, which is incorporated by reference herein in its entirety.

TECHNICAL FIELD

The present subject matter relates, in general, to user interface designing, and in particular, to a system and a method for user interface designing for an application.

BACKGROUND

With the increasing use of technology, applications, such as software applications have replaced tedious human labor in almost all avenues. For example, applications are developed and implemented for carrying out monetary transactions, accounting, travel booking, hotel management, cab management, and for other such purposes.

Generally, before launching applications for their use, the applications are tested for functionality, bugs, and glitches, in order to determine whether the applications meet required goals or not. Goals and objectives of an application may be realized by defining requirements associated with the application. The requirements of an application usually describe various functionalities of the application. On the basis of the requirements, the application is designed and developed.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures, in which.

DETAILED DESCRIPTION

The present subject matter relates to systems and methods for designing a user interface (UI) for an application. The application may include a software application.

Due to rapid changes that occur in the technology domain, the applications have to be differentiated not only on the basis of their functionality but also by taking into consideration user experience. User experience refers to the experience that users have while interacting with the application, for example, through a user interface (UI) for the application. The factors affecting the user experience of an application may be considered by a UI design team while designing the UI for the application. One of the essential parameters that influence the user experience includes usability of the application. Typically, a generic set of user experience parameters determine quality of the user experience. The user experience parameters relate to user experience in terms of user's perception and feedback that result from the use of the UI of the application.

The user experience parameters have to be applied in a right proportion to design an optimum UI for an application. Designers of UI design team take UI design decisions on the basis of the user experience parameters affecting the usability of the application. However, the degree to which the user experience parameters may be considered may vary from one designer to another designer depending on their experience and knowledge of UI designing. As a result, the UI design and the user experience in terms of usability of the UI may vary depending on the designer.

Further, if an application is complex and huge, and many factors affect the usability of the application, then quantization or determining degree of effect of the factors on the usability of the application becomes challenging for the designers. Furthermore, for a UI design team that handles a large number of applications, time taken to determine the influential factors and degree of effect of each factor on the UI design, and take UI design decision may be substantial. In such a scenario, it becomes difficult to ensure that the application that is being designed and developed will meet the underlying business objective of the application.

Therefore, many conventionally developed applications are found to lack certain requirements either at the time of testing or during deployment and operation. Further, for rectifying the issues with the application, re-designing, modifications, and re-testing of the application may be done post development. Such processes may be time consuming and resource intensive, and may incur a substantial cost.

Systems and methods for designing a user interface (UI) for an application are described herein. With the systems and the methods of the present subject matter, user experience parameters that affect user experience of the application are gathered and relative importance of each user experience parameter with respect to other user experience parameters is quantized for designing the UI for the application. With this, the burden on designers to determine the degree of effect of each user experience parameter for the UI design is substantially reduced. Further, the UI design and the user experience in terms of usability may be substantially uniform across designers designing the UI.

In an example implementation, the UI for the application may be designed based on a user interface design model, hereinafter referred to as the UI design model. In one implementation, the UI model may be a pre-configured model, configured by a design expert. The UI design model may define a plurality of user experience parameters, hereinafter referred to as pre-defined user experience parameters. The pre-defined user experience parameters relate to user experience in terms of user's perception and feedback that result from the use of the UI of the application. Further, the pre-defined user experience parameters are the parameters that influence the user experience and based on which, the UI can be assessed and designed. In an example, the pre-defined user experience parameters may include, but not limited to, 'Ease of Use', 'Speed of Use', 'Learnability', 'Consistency', 'Content', 'Accessibility', 'Flexibility', 'Aesthetics', 'Recovery from Errors', and 'Help', with respect to the usability of the UI.

In addition, the UI design model may include a plurality of attributes associated with each of the pre-defined user experience parameters that may facilitate in designing the UI of the application. In one example, the plurality of attributes may be in the form of questions, hereinafter referred to as pre-defined questions, which may be used for creating a User Experience Applicability (UEA) questionnaire for the application. The pre-defined questions pertain to requirements of a UI that affect or are associated with the pre-defined user experience parameters and enable the UI to function in an IT environment.

The UEA questionnaire may be provided to a user, for example, a designer, who is capable of designing a UI for an application. In an implementation, the UEA questionnaire may include a first set of pre-defined answers and a second set of pre-defined answers for each of the pre-defined questions. Each of the pre-defined answer in the first set is indicative of a requirement applicable for the UI with respect to a respective pre-defined question and each of the pre-defined answer in the second set is indicative of significance to business of the UI with respect to a respective pre-defined question. The user, while responding to the questionnaire, can select two answers, one from the first set and another from the second set, for each pre-defined question.

Furthermore, the UI design model may define significance to interface (STI) score for each of the pre-defined answers in the first set. The STI score for each pre-defined answer in the first set to each pre-defined question is defined with respect to each pre-defined user experience parameter. The STI score of a pre-defined answer is indicative of degree of significance of the requirement indicated by that answer with respect to a pre-defined user experience parameter. The UI design model further defines significance to business (STB) score for each of the pre-defined answers in the second set. The STB score of a pre-defined answer is indicative of degree of significance to business of the UI with respect to the requirement indicated by the corresponding pre-defined question.

According to an example implementation, for the purpose of designing a UI for an application, the UEA questionnaire may be provided to a user. For the purpose of the present subject matter, the user may be a designer capable of designing a UI for an application. Subsequently, responses are received from the user, in response to the UEA questionnaire. The responses may include user selected first answers to the pre-defined questions, where a user selected first answer to a pre-defined question is from the first set of pre-defined answers for that pre-defined question. The responses may also include user selected second answers to the pre-defined questions, where a user selected second answer to a pre-defined question is from the second set of pre-defined answers for that pre-defined question. The user selected first answer to a respective pre-defined question may be selected based on a requirement applicable for the UI with respect to the respective pre-defined question. Further, the user selected second answer to a respective pre-defined question may be selected based on the significance to business of the UI with respect to the requirement indicated by the respective pre-defined question.

Thereafter, the responses may be analyzed to determine the STI score for each of the user selected first answers with respect to each of the pre-defined user experience parameters and the STB score for each of the user selected second answers. The STI scores and the STB scores for the user selected first answers and the user selected second answers are determined from the UI design model. Further, based on the STI scores, STI weightage may be assigned to each of the user selected first answers with respect to the pre-defined user experience parameters. A STI weightage for a user selected first answer with respect to a pre-defined user experience parameter is indicative of degree of significance of a corresponding requirement with respect to the pre-defined user experience parameter. In an example, the STI weightage to a user selected first answer is assigned same as the STI score associated with that answer in the UI design model. Similarly, based on the STB scores, STB weightage is assigned to each of the user selected second answers, where a STB weightage for a user selected second answer to a pre-defined question is indicative of degree of significance to business of the UI with respect to the pre-defined question. In one example, the STB weightage to a user selected second answer is assigned same as the STB score associated with that answer in the UI design model.

Thereafter, total actual effective weightage is computed for each pre-defined user experience parameter, where the total effective weightage for a respective pre-defined user experience parameter is computed based on the STI weightages of the user selected first answers with respect to the respective pre-defined user experience parameter and the STB weightages of the user selected second answers. Subsequently, total maximum effective weightage for each pre-defined user experience parameter is calculated. In one example, total maximum effective weightage for a respective pre-defined user experience parameter is calculated based on maximum possible STI weightage for the first set of pre-defined answers for each of the pre-defined questions with respect to the respective pre-defined user experience parameter and maximum possible STB weightage for the second set of pre-defined answers for each of the pre-defined questions.

Once, the total actual effective weightages and total maximum effective weightages are calculated for the pre-defined user experience parameters, an applicability index for each pre-defined user experience parameter is determined based on ratio of the total actual effective weightage to the total maximum effective weightage for a respective pre-defined user experience parameter. An applicability index for a pre-defined user experience parameter is indicative of relative importance of the pre-defined user experience parameter with respect to other pre-defined user experience parameters, based on which the user can design the UI for the application. The applicability index of each of the pre-defined user experience parameters may be displayed to the user on a user device for allowing the user to design the UI based on the applicability index.

According to the present subject matter, since the same UI design model is used by every user or designer for designing a UI for an application, the UI usability standard does not vary across the designers. Further, determination of degree of applicability of each of the pre-defined user experience parameters, through applicability indices as described herein, helps the designers to take apt decisions for designing the UI for an application. Based on the applicability indices, the designers would know how much importance they have to give to each user experience parameter while designing the UI. For example, a designer may not take a user experience parameter into consideration for which degree of applicability is lowest.

Further, according to the present subject matter, determination of degree of applicability of each of the pre-defined user experience parameters on the usability of the application is an automated process, where the designers only have to provide response to the pre-defined questions. As a result, substantially less time is consumed and designing of UI for an application becomes faster and is free from errors. Further, since the requirements of the application and others parameters associated with the requirements are explicitly defined and considered in the UI design model before designing the UI of the application, the UI may not undergo modifications after the initial designing. As a result, the cost associated with UI re-designing may be mitigated.

The present subject matter thus provides a framework implemented to capture, analyze, and refine requirements of the UI of the application to be designed for efficient development of application of better quality. Thus, the framework as described herein, makes UI designing efficient in terms of cost, resources, and time used, and also increases the reliability of the UI of the application.

The following disclosure describes system and method for designing a user interface (UI) for an application. While aspects of the described system and method can be implemented in any number of different computing systems, environments, and/or configurations, embodiments for designing a UI for an application are described in the context of the following exemplary system(s) and method(s).

Figure 1:
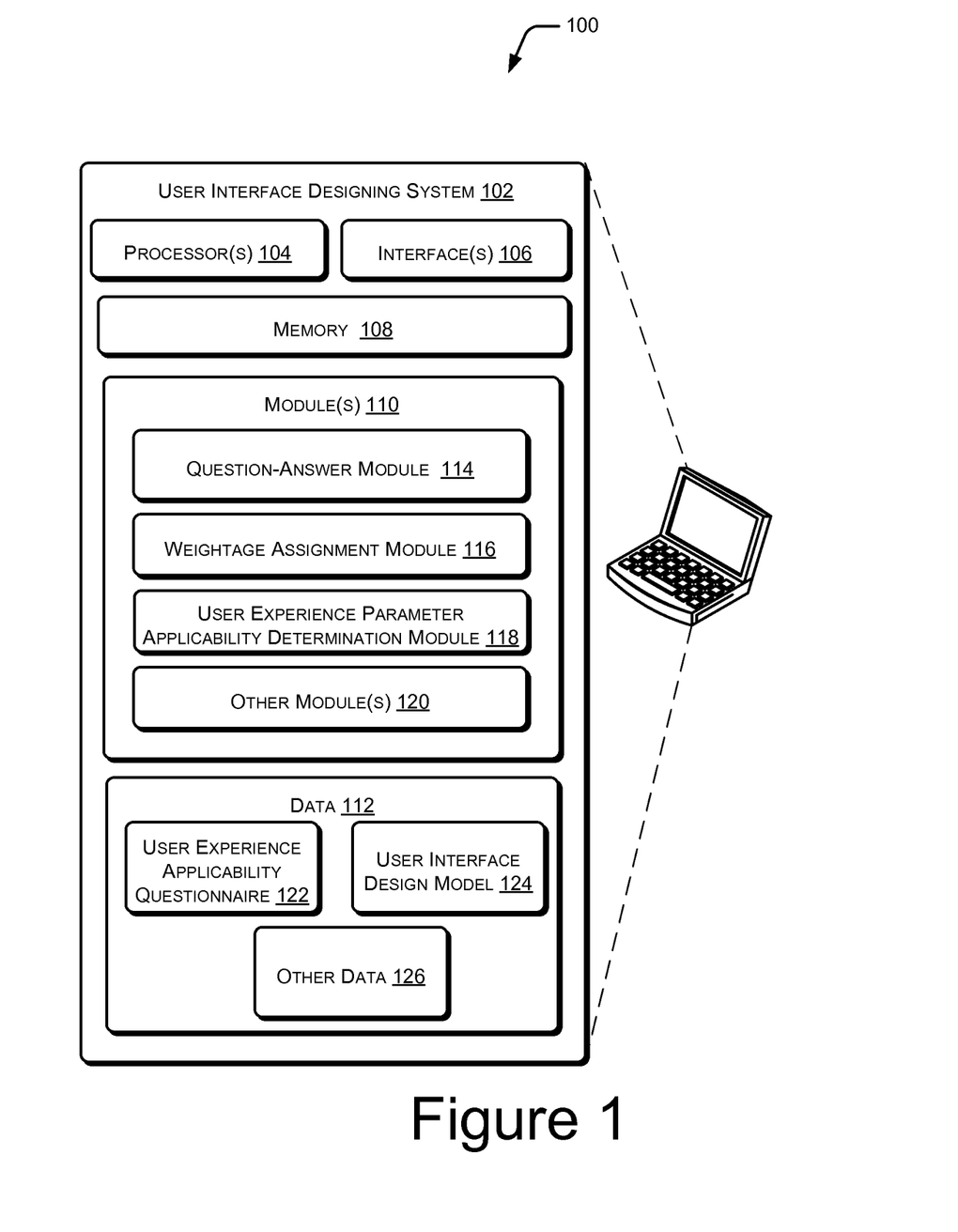
FIG. 1 illustrates an environment implementing a user interface designing system, according to an embodiment of the present subject matter.

FIG. 1 illustrates an environment 100 implementing a user interface designing (UID) systems 102, in accordance with an embodiment of the present subject matter. In said embodiment, the UID system 102 facilitates in designing of user interface (UI) for an application. The application may be a software application belonging to any technology, domain, or device.

In one implementation, the environment 100 can be a public network environment, including thousands of individual computers, laptops, various servers, such as blade servers, and other computing devices. In another implementation, the environment 100 can be a private network environment with a limited number of computing devices, such as individual computers, servers, and laptops. The UID system 102 may be implemented in a variety of computing systems, such as a laptop computer, a desktop computer, a notebook, a smartphone, a tablet, a workstation, a mainframe computer, a server, a network server, and the like.

According to an implementation, the UID system 102 includes processor(s) 104, interface(s) 106, and memory 108 coupled to the processor(s) 104. The processor(s) 104 may be implemented as one or more microprocessors, microcomputers, microcontrollers, digital signal processors, central processing units, state machines, logic circuitries, and/or any devices that manipulate signals based on operational instructions. Among other capabilities, the processor(s) 104 may be configured to fetch and execute computer-readable instructions stored in the memory 108.

The memory 108 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 106 may include a variety of software and hardware interfaces, for example, interfaces for peripheral device(s), such as a product board, a mouse, an external memory, and a printer. Additionally, the interface(s) 106 may enable the UID system 102 to communicate with other devices, such as web servers and external repositories. The interface(s) 106 may also facilitate multiple communications within a wide variety of networks and protocol types, including wired networks, for example, LAN, cable, etc., and wireless networks, such as WLAN, cellular, or satellite. For the purpose, the interface(s) 106 may include one or more ports.

The UID system 102 also includes module(s) 110 and data 112. The module(s) 110 include, for example, a question-answer (Q-A) module 114, a weightage assignment module 116, a user experience parameter applicability (UXPA) determination module 118, and other module(s) 120. The other modules 120 may include programs or coded instructions that supplement applications or functions performed by the UID system 102. The data 112 may include User Experience Applicability (UEA) questionnaire 122, user interface (UI) design model 124, and other data 126. In one example, the UEA questionnaire 122 may be a part of the UI design model 124. The other data 126, amongst other things, may serve as a repository for storing data that is processed, received, or generated as a result of the execution of one or more modules in the module(s) 110.

Although the data 112 is shown internal to the UID system 102, it will be appreciated by a person skilled in the art that the data 112 can also be implemented external to the UID system 102, wherein the data 112 may be stored in an external database, and the UID system 102 may communicate with the external database for performing the functions as described herein. For example, the UEA questionnaire 122 and the UI design model 124 stored in the external database may be retrieved whenever UI for an application is to be designed based on the UID system 102. The UEA questionnaire 122 and the UI design model 124 contained within such external database may be periodically updated. For example, new training data may be added into the database, existing UEA questionnaire 122 and UI design model 124 may be modified, or non-useful data may be deleted from the database.

In one embodiment of the present subject matter, for the purpose of designing the UI for the application, the UEA questionnaire 122 and the UI design model 124 may be pre-configured. In one example, the UEA questionnaire 122 and the UI design model 124 may be configured by a UI design expert.

The UI design model 124 may define a plurality of user experience parameters, hereinafter referred to as pre-defined user experience parameters. The pre-defined user experience parameters relate to user experience in terms of user's perception and feedback that result from the use of UI of application. Further, the pre-defined user experience parameters are the parameters that influence the user experience and based on which, the UI can be assessed and designed. In an example, the pre-defined user experience parameters may include 'Ease of Use', 'Speed of Use', 'Learnability', 'Consistency', 'Content', 'Accessibility', 'Flexibility', 'Aesthetics', 'Recovery from Errors', and 'Help', with respect to the usability of the UI.

As mentioned above, the pre-defined user experience parameters may facilitate assessment of the application. For example, 'Ease of Use' user experience parameter may identify whether the UI of the application is intuitive enough to be used without external aids, such as user manual or human intervention. 'Speed of Use' user experience parameter may identify whether the UI facilitates a smooth interaction with applications enabling the users to accomplish goals in a minimal timeframe. Further, the 'Learnability' user experience parameter may assess whether the users can easily and quickly learn to navigate and use the application.

The UI design model 124 also includes a plurality of attributes associated with each of the pre-defined user experience parameters that may facilitate in designing the UI of the application. In one example, the plurality of attributes may be in the form of questions which may be used for creating the UEA questionnaire 122 for the application. The pre-defined questions pertain to requirements of a UI that affect or are associated with the pre-defined user experience parameters and enable the UI to function in an IT environment.

In an implementation, the UEA questionnaire 122 may include a first set of pre-defined answers and a second set of pre-defined answers for each of the pre-defined questions. The pre-defined answers from the first set and the second set are selectable by the user and, for example, provided in drop-down format. An exemplary UEA questionnaire 122 comprising the plurality of pre-defined questions and selectable pre-defined answers in the first set and in the second set for each of the pre-defined question is provided in Table 1 below. The UEA questionnaire 122 illustrated in Table 1 is for the purpose of explanation and is by no means restricted to the example mentioned herein.

TABLE 1

| Questions | First Set | Second Set |
|---|---|---|
| Is primary usage of the application is to do tasks efficiently or explore information content? | To do task efficiently Explore information content | Not Applicable Low Medium High |
| Are you dependent on end user for word of mouth publicity of application? | Yes No | Not Applicable Low Medium High |
| Is Internationalization expected? | Yes No | Not Applicable Low Medium High |
| What is the Primary Device used for the application? | Desktop Mobile/Tablet Kiosk | Not Applicable Low Medium High |
| Does the application expects user to do customization? | Yes No | Not Applicable Low Medium High |
| For primary users' roles, what is the frequency of using the application to perform the primary task? | High (More than 7 times in a week) Medium (Between twice to 6 times a week) Low (Not more than once in a week) | Not Applicable Low Medium High |
| What is the level of Accessibility that the application must comply? | A AA AAA | Not Applicable Low Medium High |
| The novice application users are expected to understand and learn the primary tasks, after . . . | . . . first or Second usage of application and Exploration . . . receiving a training | Not Applicable Low Medium High |
| Is one of your primary user persona an elderly? | Yes No | Not Applicable Low Medium High |
| What is the Tech savyness level of your primary set of users? | Beginner Advance Beginner Expert | Not Applicable Low Medium High |
| Do users have knowledge of the product domain? | Yes No | Not Applicable Low Medium High |
| Is there a dedicated help/support team available for the users? | Yes No | Not Applicable Low Medium High |
| Do you need the UI to consume low power? | Yes No | Not Applicable Low Medium High |

TABLE 1-continued

| Questions | First Set | Second Set |
|---|---|---|
| Will the usage and access be restricted within Office premises? | Yes No | Not Applicable Low Medium High |

The first column of Table 1 lists the questions that are related to the pre-defined user experience parameters. The second column lists a first set of pre-defined answers comprising all possible answers associated with each of the questions. A pre-defined answer to a respective question, in the first set, is indicative of a possible requirement that may be applicable for the UI with respect to the respective question. Further, third column lists a second set of pre-defined answers comprising all possible answers for each of the questions. A pre-defined answer to a respective pre-defined question, in the second set, is indicative of significance to business of the UI with respect to the respective pre-defined question. For example, for the question 'Is primary usage of the application is to do tasks efficiently or explore information content?', the answer, from the second set, as 'Low' means significance to business of the UI is low with respect to the usage of application for doing task efficiently and for exploring information content through the application. Similarly, for the question 'Does the application expects user to do customization?', the answer, from the second set, as 'High' means significance to business of the UI is High with respect to the user based customization of the application. Further, as can be seen in Table 1, first set of pre-defined answers vary for each question. However, second set of pre-defined answers are same for each question.

The UI design model 124 also defines significance to interface (STI) score for each of the pre-defined answers in the first set with respect to each of the pre-defined user experience parameters. The STI score of a pre-defined answer is indicative of degree of significance of the requirement indicated by that pre-defined answer with respect to a pre-defined user experience parameter. Further, the UI design model 124 defines significance to business (STB) score for each of the pre-defined answers in the second set. The STB score of a pre-defined answer is indicative of degree of significance to business of the UI with respect to the pre-defined question to which that pre-defined answer corresponds. An exemplary UI design model 124 with the STI scores and the STB scores is provided in Table 2 below. The STI scores and the STB scores illustrated in Table 1 are for the purpose of explanation and are by no means restricted to the examples mentioned herein.

TABLE 2

| | | | User Experience Parameter 1 | | . . . | User Experience Parameter n | |
|---|---|---|---|---|---|---|---|
| Questions | First Set | Second Set | STI Score | STB Score | . . . | STI Score | STB Score |
| Question - 1 | Answer-1 | Answer-1 | 0 | 0 | | 1 | 0 |
| | Answer-2 | Answer-2 | | 1 | | | 1 |
| | | Answer-3 | 1 | 2 | | 0 | 2 |
| | | Answer-4 | | 3 | | | 3 |
| Question - 2 | Answer-1 | Answer-1 | 1 | 0 | | 0 | 0 |
| | | Answer-2 | | 1 | | | 1 |
| | Answer-2 | Answer-3 | 0 | 2 | | 1 | 2 |
| | | Answer-4 | | 3 | | | 3 |

TABLE 2-continued

| Questions | First Set | Second Set | User Experience Parameter 1 | | ... | User Experience Parameter n | |
|---|---|---|---|---|---|---|---|
| | | | STI Score | STB Score | ... | STI Score | STB Score |
| Question - 3 | Answer-1 | Answer-1 | 1 | 0 | | 0 | 0 |
| | | Answer-2 | | 1 | | | 1 |
| | Answer-2 | Answer-3 | 0 | 2 | | 1 | 2 |
| | | Answer-4 | | 3 | | | 3 |
| . | | | | | | | |
| . | | | | | | | |
| Question - n | Answer-1 | Answer-1 | 0 | 0 | | 1 | 0 |
| | | Answer-2 | | 1 | | | 1 |
| | Answer-2 | Answer-3 | 1 | 2 | | 0 | 2 |
| | | Answer-4 | | 3 | | | 3 |

The first column of Table 2 lists the questions with respect to the pre-defined user experience parameters. The second column lists the first set of pre-defined answers, and the third column lists the second set of pre-defined answers. It may be understood that the questions, the first set and the second set of pre-defined answers of Table 2 may be same as the pre-defined questions, and the pre-defined answers in the first set and the second set as illustrated in Table 1. The fourth column in Table 2 lists the STI score of each of the pre-defined answers in the first set for each question with respect to the first user experience parameter. Further, the seventh column lists the STI score of each of the pre-defined answers in the first set for each question with respect to nth user experience parameter. The fifth column and the eighth column list the STB score of each pre-defined answer in the second set for each pre-defined question.

As can be seen in Table 2, the STI scores vary for each pre-defined user experience parameter. For instance, for question 1, the STI score of answer 1 in the first set is 0 and for answer 2 in the first set is 1 with respect to first user experience parameter. However, the STI score of answer 1 in the first set is 1 and for answer 2 in the first set is 0 with respect to nth user experience parameter. Further, as can be seen in Table 2, the STB scores for the answers in the second set with respect to each user experience parameter are same.

In an example, the UI design model 124 may be configured to be scalable, i.e. the UI design model 124 may be capable of performing efficiently even when the user experience parameters or questions are increased. For example, the UI design model 124 may be configured in manner that additional user experience parameters, questions, and answers to the questions may be defined within the UI design model 124 based on the requirements of the application for which UI is to be designed. The manner in which the UID system 102 facilitates in designing of UI for an application is described henceforth.

In an implementation, for the purpose of designing the UI, the Q-A module 114 of the UID system accesses the UEA questionnaire 122 stored in the data 112. The Q-A module 114 may, subsequently, provide the UEA questionnaire 122 to a user. In an example, the user may be a designer, who is capable of designing a UI for an application. Further, the Q-A module 114 may receive responses from the user, in response to the UEA questionnaire 122. The user, while responding to the UEA questionnaire 122, can select two answers, one from the first set and another from the second set, for each pre-defined question.

The Q-A module 114 receives a first response from the user comprising user selected first answers to the pre-defined questions, where a user selected first answer to a pre-defined question is from amongst the first set of pre-defined answers for that pre-defined question. As mentioned earlier, a user selected first answer to a respective pre-defined question is indicative of a requirement applicable for the UI with respect to the respective pre-defined question. For example, referring to Table 1, for the pre-defined question 'Is primary usage of the application is to do tasks efficiently or explore information content?', the user may select an answer from the first set of pre-defined answers corresponding to the question. For instance, the user may either select 'To do task efficiently' or 'Explore information content' for the question. Taking another example, for the pre-defined question 'Do users have knowledge of the product domain?', the user may select either 'Yes' or 'No'.

Subsequently, the Q-A module 114 receives a second response from the user comprising user selected second answers to the pre-defined questions, where a user selected second answer to a pre-defined question is from amongst the second set of pre-defined answers for that pre-defined question. A user selected second answer to a respective pre-defined question is indicative of significance to business of the UI with respect to the respective pre-defined question. Again referring to Table 1, for the pre-defined question 'Is primary usage of the application is to do tasks efficiently or explore information content?', the user may select any one of the four answers, 'Not Applicable', 'Low', 'Medium', and 'High'.

In an example, the first response and the second response may be provided by the user through a user device. The user device may include, but is not limited to, a desktop computer, a portable computer, a mobile phone, a handheld device, and a workstation.

Further, the weight assignment module 116 assigns STI weightage to each of the user selected first answers, for each pre-defined question, with respect to each of the pre-defined user experience parameters. A STI weightage for a user selected first answer with respect to a pre-defined user experience parameter is indicative of degree of significance of a corresponding requirement with respect to the pre-defined user experience parameter. For this purpose, the weight assignment module 116 may assess the UI design model 124 stored in the data 112.

The weight assignment module 116 analyzes the first response received from the user to determine a STI score associated with each of the user selected first answers with respect to each of the pre-defined user experience parameters from the UI design model 124. Further, based on the STI scores, the weight assignment module 116 may assign the STI weightage to each of the user selected first answers with respect to the pre-defined user experience parameters. In an example, the weight assignment module 116 may assign a STI weightage to a user selected first answer same as the STI score associated with that answer in the UI design model 124.

For example, referring to Table 2, if for the pre-defined question 'Question-1', the user selected first answer is 'Answer-1', then STI score associated with 'Answer-1' with respect to user experience parameters 1 is '0' and with respect to user experience parameter n is '1'. Therefore, for the pre-defined question 'Question-1', the weight assignment module 116 may assign STI weightage '0' to the user selected first answer with respect to user experience parameters 1 and STI weightage '1' with respect to user experience parameters n.

The weight assignment module 116 also assigns STB weightage to each of the user selected second answers, for each pre-defined question. A STB weightage for a user selected second answer to a pre-defined question is indicative of degree of significance to business of the UI with respect to the pre-defined question. For this, the weight assignment module 116 analyzes the second response received from the user to determine a STB score associated with each of the user selected second answers from the UI design model 124, and assign the STB weightage to each user selected second answer based on STB score. In an example, the weight assignment module 116 may assign a STB weightage to a user selected second answer same as the STB score associated with that answer in the UI design model 124.

For example, referring to Table 2, if for the pre-defined question 'Question-1', the user selected second answer is 'Answer-3', then STB score associated with 'Answer-3' is '2'. Therefore, for the pre-defined question 'Question-1', the weight assignment module 116 may assign STB weightage '2' to the user selected second answer. As can be seen in Table 2, STB weightages of the user selected second answers remain consistent for each of the pre-defined user experience parameter.

Once the STI weightages and STB weightages are assigned to the user selected first answers and user selected second answers, respectively, the UXPA determination module 118 computes total actual effective weightage for each pre-defined user experience parameter. In one example, the UXPA determination module 118 computes total effective weightage for a respective pre-defined user experience parameter based on summation of multiplication of the STI weightages of the user selected first answers with respect to the respective pre-defined user experience parameter with the STB weightages of the user selected second answers.

The UXPA determination module 118 computes the total actual effective weightage for a pre-defined user experience parameter using equation (1) provided below:

$$E_{Actual}^j = \Sigma_{i=1}^n STI_i^j * STB_i, j \in 1, \ldots, m \quad (1)$$

where, $E_{Actual}^j$ represents total actual effective weightage for $j^{th}$ pre-defined user experience parameter, n represents total number of pre-defined questions, m represents total number of pre-defined user experience parameters, $STI_i^j$, for $j^{th}$ pre-defined user experience parameter, represents STI weightage of user selected first answer for $i^{th}$ pre-defined question, and $STB_i$ represents STB weightage of user selected second answer for the $i^{th}$ pre-defined question.

Therefore, to compute the total actual effective weightage for a pre-defined user experience parameter, the UXPA determination module 118 considers STI weightage of user selected first answer for each pre-defined question with respect to the pre-defined user experience parameter and STB weightage of user selected second answer for each pre-defined question.

Thereafter, the UXPA determination module 118 calculates total maximum effective weightage for each pre-defined user experience parameter. In one example, the UXPA determination module 118 calculates total maximum effective weightage for a respective pre-defined user experience parameter based on summation of multiplication of maximum possible STI weightage for the first set of pre-defined answers for each of the pre-defined questions with respect to the respective pre-defined user experience parameter with maximum possible STB weightage for the second set of pre-defined answers for each of the pre-defined questions.

In one example, if for the pre-defined question 'Question-1', STI weightage of 'Answer-1' is '0' and STI weightage of 'Answer-2' is '1' with respect to the user experience parameter 1, then for the pre-defined question 'Question-1', maximum possible STI weightage with respect to the user experience parameter 1 is '1'. In another example, if for the pre-defined question 'Question-1', STB weightage of 'Answer-1' is '0', STB weightage of 'Answer-2' is '1', STB weightage of 'Answer-3' is '2', and STB weightage of 'Answer-4' is '3', then for the pre-defined question 'Question-1', maximum possible STB weightage is '3'.

The UXPA determination module 118 calculates the total maximum effective weightage for a pre-defined user experience parameter using equation (2) provided below:

$$=E_{Maximum}^j = \Sigma_{i=1}^n MSTI_i^j * MSTB_i, j \in 1, \ldots, m \quad (2)$$

where, $E_{Maximum}^j$ represents total maximum effective weightage of $i^{th}$ pre-defined user experience parameter, n represents total number of pre-defined questions, m represents total number of pre-defined user experience parameters, $MSTI_i^j$ represents maximum possible STI weightage for $i^{th}$ pre-defined question with respect to $i^{th}$ pre-defined user experience parameter, and $MSTB_i$ represents maximum possible STB weightage for the $i^{th}$ pre-defined question.

Therefore, to compute the total maximum effective weightage for a pre-defined user experience parameter, the UXPA determination module 118 considers maximum possible STI weightage for each pre-defined question with respect to the pre-defined user experience parameter and maximum possible STB weightage for each pre-defined question.

Further, after calculating the total actual effective weightage and total maximum effective weightage for each of the pre-defined user experience parameter, the UXPA determination module 118 determines an applicability index for each pre-defined user experience parameter. In one example, the UXPA determination module 118 determines an applicability index for a respective pre-defined user experience parameter based on ratio of the total actual effective weightage to the total maximum effective weightage for the respective pre-defined user experience parameter. An applicability index for a pre-defined user experience parameter is indicative of relative importance of the pre-defined user experience parameter with respect to other pre-defined user experience parameters, based on which the user can designing the UI for the application.

The UXPA determination module 118 determines an applicability index for a pre-defined user experience parameter using equation (3) provided below:

$$AI^j = \frac{E_{Actual}^j = \sum_{i=1}^n STI_i^j * STB_i}{E_{Maximum}^j = \sum_{i=1}^n MSTI_i^j * MSTB_i} \times 100, j \in 1, \ldots, m \quad (3)$$

where, $AI^j$ represents applicability index of $j^{th}$ pre-defined user experience parameter, n represents total number of pre-defined questions, m represents total number of pre-defined user experience parameters, $E_{Actual}^j$ represents actual effective weight for $j^{th}$ pre-defined user experience parameter, and $E_{maximum}^j$ represents maximum effective weight of $j^{th}$ pre-defined user experience parameter.

Thereafter, the UXPA determination module 118 displays the applicability index of each of the pre-defined user experience parameters to the user on the user device for allowing the user to design the UI based on the applicability index. Therefore, the user would know how much important each of the user experience parameters is for designing the UI. This helps the user to take apt decisions for designing a UI for an application. For example, the user may not take a user experience parameter into consideration while designing the UI for which applicability index is lowest.

Figure 2A:
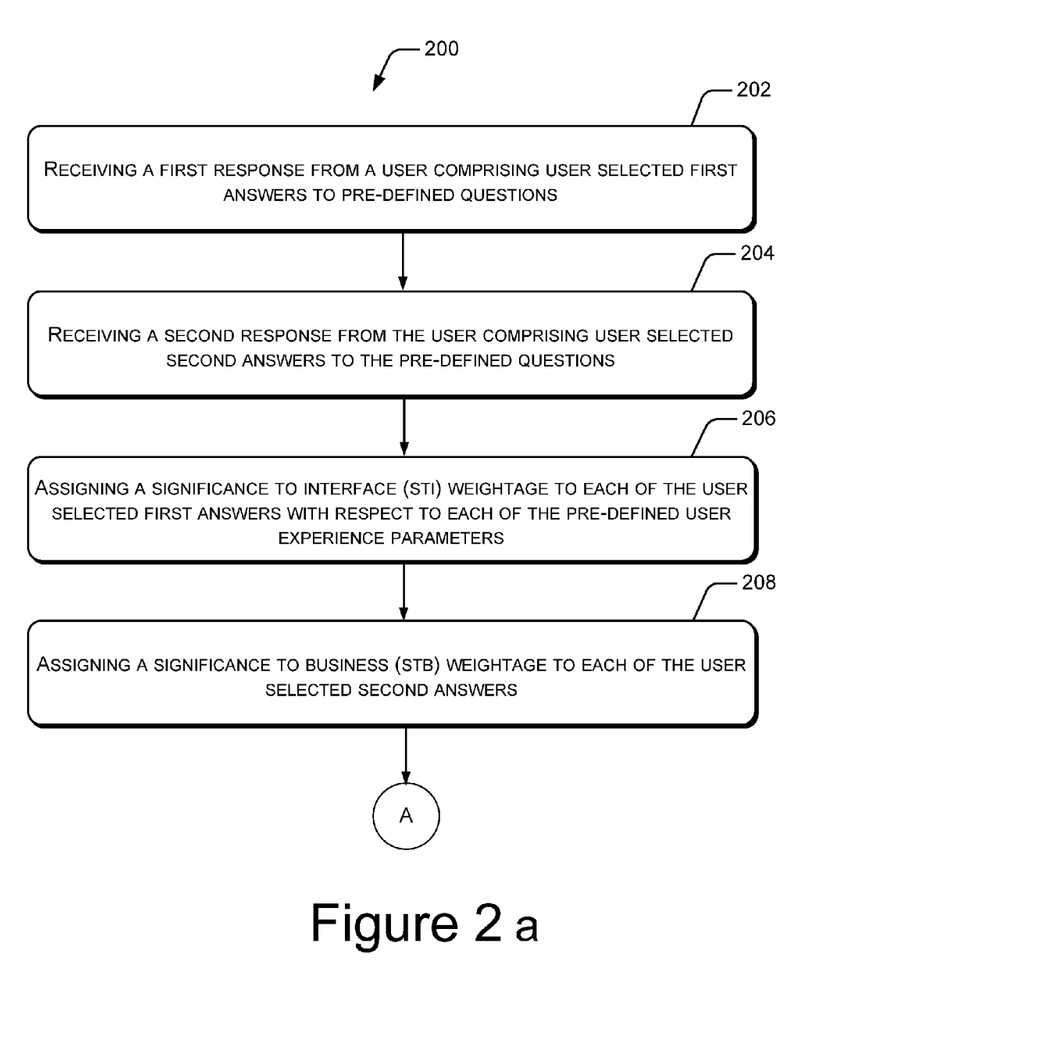
FIGS. 2a and 2b illustrates a method for designing a user interface for an application, according to an embodiment of the present subject matter.
Figure 2B:
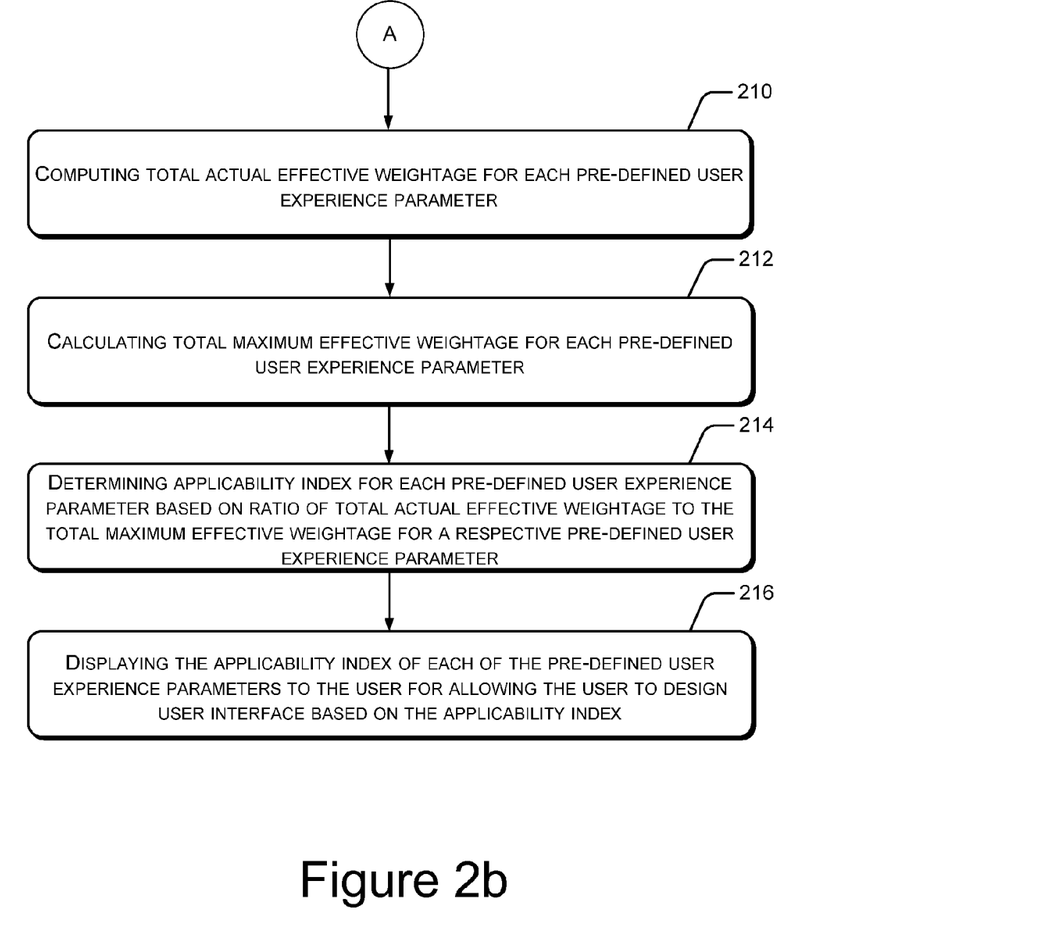

FIGS. 2a and 2b illustrates a method 200 for designing a user interface (UI) for an application, according to an embodiment of the present subject matter. The method 200 is implemented in a computing device, such as a user interface designing (UID) system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Furthermore, the method can be implemented in any suitable hardware, software, firmware or combination thereof.

At block 202, the method 200 includes receiving a first response from a user comprising user selected first answers to pre-defined questions, where a user selected first answer to a respective pre-defined question is indicative of a requirement applicable for user interface (UI) with respect to the respective pre-defined question. The pre-defined questions pertain to requirements of the UI associated with pre-defined user experience parameters, where the pre-defined user experience parameters are indicative of user experience for the UI. In an implementation, a UEA questionnaire comprising the pre-defined questions may be provided to a user. Subsequently, a first response is received from the user, in response to the UEA questionnaire. The first response includes user selected first answers to the pre-defined questions, where a user selected first answer to a pre-defined question is from the first set of pre-defined answers for that pre-defined question. In accordance with one implementation of the present subject matter, the question-answer (Q-A) module 114 of the UID system 102 receives first response from the user.

At block 204, the method 200 includes receiving a second response from the user comprising user selected second answers to the pre-defined questions, where a user selected second answer to a respective pre-defined question is indicative of significance to business of the UI with respect to the respective pre-defined question. In one implementation, the Q-A module 114 receives the second response from the user.

At block 206, the method 200 includes assigning a significance to interface (STI) weightage to each of the user selected first answers with respect to each of the pre-defined user experience parameters. A STI weightage for a user selected first answer with respect to a pre-defined user experience parameter is indicative of degree of significance of a corresponding requirement with respect to the pre-defined user experience parameter. In one example, STI weightage to a user selected first answer may be assigned based on the STI score associated with the user selected first answer in the UI design model. In one implementation, weightage assignment module 116 of the UID system 102 assigns a STI weightage to each of the user selected first answers with respect to each of the pre-defined user experience parameter.

At block 208, the method 200 includes assigning significance to business (STB) weightage to each of the user selected second answers. A STB weightage for a user selected second answer to a pre-defined question is indicative of degree of significance to business of the UI with respect to the pre-defined question. In one example, STB weightage to a user selected second answer may be assigned based on the STB score associated with the user selected second answer in the UI design model. In one implementation, weightage assignment module 116 of the UID system 102 assigns a STB weightage to each of the user selected second answers with respect to each of the pre-defined user experience parameter.

At block 210, the method 200 includes computing total actual effective weightage for each pre-defined user experience parameter. In one example, the total effective weightage for a respective pre-defined user experience parameter is computed based on summation of multiplication of the STI weightages of the user selected first answers with respect to the respective pre-defined user experience parameter with the STB weightages of the user selected second answers. According to one implementation, user experience parameter applicability (UXPA) determination module 118 of the UID system 102 computes total actual effective weightage for each pre-defined user experience parameter.

At block 212, the method 200 includes calculating total maximum effective weightage for each pre-defined user experience parameter. In one example, the total maximum effective weightage for a respective pre-defined user experience parameter is calculated based on summation of multiplication of maximum possible STI weightage for the first set of pre-defined answers for each of the pre-defined questions with respect to the respective pre-defined user experience parameter with maximum possible STB weightage for the second set of pre-defined answers for each of the pre-defined questions. In one implementation, the UXPA determination module 118 calculates total maximum effective weightage for each pre-defined user experience parameter.

At block 214, the method 200 includes determining applicability index for each pre-defined user experience parameter based on ratio of total actual effective weightage to the total maximum effective weightage for a respective pre-defined user experience parameter. An applicability index for a pre-defined user experience parameter is indicative of relative importance of the pre-defined user experience parameter with respect to other pre-defined user experience parameters, based on which the user can designing the UI for the application. In one implementation, the UXPA determination module 118 determines applicability index for each pre-defined user experience parameter.

At block 216, the method 200 includes displaying the applicability index of each of the pre-defined user experience parameters to the user for allowing the user to design user interface based on the applicability index. In one implementation, the UXPA determination module 118 displays the applicability index of each of the pre-defined user experience parameters to the user on a user device for allowing the user to design user interface based on the applicability index.

Although embodiments for methods and systems for designing a user interface (UI) for an application have been described in a language specific to structural features and/or methods, it is to be understood that the invention is not necessarily limited to the specific features or methods described. Rather, the specific features and methods are disclosed as exemplary embodiments for designing a user interface (UI) for an application.

We claim:

1. A method for designing a user interface (UI) for an application, the method comprising:

receiving a first response from a user comprising user selected first answers to pre-defined questions, wherein the pre-defined questions pertain to requirements of the UI associated with pre-defined user experience parameters, wherein the pre-defined user experience parameters are indicative of user experience for the UI, and wherein a user selected first answer to a respective pre-defined question is indicative of a requirement applicable for the UI with respect to the respective pre-defined question;

receiving a second response from the user comprising user selected second answers to the pre-defined questions, wherein a user selected second answer to a respective pre-defined question is indicative of significance to business of the UI with respect to the respective pre-defined question;

assigning a significance to interface (STI) weightage to each of the user selected first answers with respect to each of the pre-defined user experience parameters, wherein a STI weightage for a user selected first answer with respect to a pre-defined user experience parameter is indicative of degree of significance of a corresponding requirement with respect to the pre-defined user experience parameter;

assigning a significance to business (STB) weightage to each of the user selected second answers, wherein a STB weightage for a user selected second answer to a pre-defined question is indicative of degree of significance to business of the UI with respect to the pre-defined question;

computing total actual effective weightage for each pre-defined user experience parameter, wherein total effective weightage for a respective pre-defined user experience parameter is computed based on the STI weightages of the user selected first answers with respect to the respective pre-defined user experience parameter and the STB weightages of the user selected second answers;

calculating total maximum effective weightage for each pre-defined user experience parameter, wherein the total maximum effective weightage for a respective pre-defined user experience parameter is calculated based on maximum possible STI weightage for a first set of pre-defined answers for each of the pre-defined questions with respect to the respective pre-defined user experience parameter and maximum possible STB weightage for a second set of pre-defined answers for each of the pre-defined questions; and determining an applicability index for each pre-defined user experience parameter based on ratio of the total actual effective weightage to the total maximum effective weightage for a respective pre-defined user experience parameter, wherein an applicability index for a pre-defined user experience parameter is indicative of relative importance of the pre-defined user experience parameter with respect to other pre-defined user experience parameters for designing the UI for the application.

2. The method as claimed in claim 1, wherein the pre-defined user experience parameters comprise 'Ease of Use', 'Speed of Use', 'Learnability', 'Consistency', 'Content', 'Accessibility', 'Flexibility', 'Aesthetics', 'Recovery from Errors', and 'Help'.

3. The method as claimed in claim 1, wherein the user selected first answer for a respective pre-defined question is from amongst the first set of pre-defined answers for the respective pre-defined question, wherein each of the pre-defined answers in the first set is associated with an STI score with respect to each of the pre-defined user experience parameters based on which the STI weightage is assigned to the user selected first answer, wherein the STI score of a pre-defined answer is indicative of degree of significance of the corresponding requirement with respect to a pre-defined user experience parameter.

4. The method as claimed in claim 1, wherein the user selected second answer for a respective pre-defined question is from amongst the second set of pre-defined answers for the respective pre-defined question, wherein each of the pre-defined answers in the second set is associated with an STB score based on which the STB weightage is assigned to the user selected second answer, and wherein the STB score of a pre-defined answer is indicative of degree of significance to business of the UI with respect to the corresponding pre-defined question.

5. The method as claimed in claim 1, wherein the computing total actual effective weightage for each pre-defined user experience parameter is based on:

$$E_{Actual}^{j}=\Sigma_{i=1}^{n} STI_{i}^{j} * STB_{i}, j\in 1,\ldots,m$$

wherein $E_{Actual}^{j}$ represents total actual effective weightage for $j^{th}$ pre-defined user experience parameter, n represents total number of pre-defined questions, m represents total number of pre-defined user experience parameters, $STI_{i}^{j}$, for $j^{th}$ pre-defined user experience parameter, represents STI weightage of user selected first answer for $i^{th}$ pre-defined question, and $STB_{i}$ represents STB weightage of user selected second answer for the $i^{th}$ pre-defined question.

6. The method as claimed in claim 1, wherein the calculating total maximum effective weightage for each pre-defined user experience parameter is based on:

$$=E_{Maximum}^{j}=\Sigma_{i=1}^{n} MSTI_{i}^{j} * MSTB_{i}, j\in 1,\ldots,m$$

wherein $E_{Maximum}^{j}$ represents total maximum effective weightage of $j^{th}$ pre-defined user experience parameter, n represents total number of pre-defined questions, m represents total number of pre-defined user experience parameters, $MSTI_{i}^{j}$ represents maximum possible STI weightage for $i^{th}$ pre-defined question with respect to $j^{th}$ pre-defined user experience parameter, and $MSTB_{i}$ represents maximum possible STB weightage for the $i^{th}$ pre-defined question.

7. The method as claimed in claim 1 further comprising:
displaying the applicability index of each of the pre-defined user experience parameters to the user for allowing the user to design the UI based on the applicability index.

8. A user interface designing system for designing a user interface (UI) for an application, the user interface designing system comprising:

a processor;

a question-answer module coupled to the processor to,
receive a first response from a user comprising user selected first answers to pre-defined questions, wherein the pre-defined questions pertain to requirements of the UI associated with pre-defined user experience parameters, wherein the pre-defined user experience parameters are indicative of user experience for the UI, and wherein a user selected first answer to a respective pre-defined question is indicative of a requirement applicable for the UI with respect to the respective pre-defined question; and receive a second response from the user comprising user selected second answers to the pre-defined questions, wherein a user selected second answer to a respective pre-defined question is indicative of significance to business of the UI with respect to the respective pre-defined question;

a weightage assignment module coupled to the processor to, assign a significance to interface (STI) weightage to each of the user selected first answers with respect to each of the pre-defined user experience parameters, wherein an STI weightage for a user selected first answer with respect to a pre-defined user experience parameter is indicative of degree of significance of a corresponding requirement with respect to the pre-defined user experience parameter; and assign a significance to business (STB) weightage to each of the user selected second answers, wherein an STB weightage for a user selected second answer to a pre-defined question is indicative of degree of significance to business of the UI with respect to the pre-defined question;

a user experience parameter applicability determination module coupled to the processor to, compute total actual effective weightage for each pre-defined user experience parameter, wherein total effective weightage for a respective pre-defined user experience parameter is computed based on summation of multiplication of the STI weightages of the user selected first answers with respect to the respective pre-defined user experience parameter with the STB weightages of the user selected second answers;

calculate total maximum effective weightage for each pre-defined user experience parameter, wherein total maximum effective weightage for a respective pre-defined user experience parameter is computed based on summation of multiplication of maximum possible STI weightage for a first set of pre-defined answers for each of the pre-defined questions with the respective pre-defined user experience parameter with maximum possible STB weightage for a second set of pre-defined answers for each of the pre-defined questions; and determine an applicability index for each pre-defined user experience parameter based on ratio of the total actual effective weightage to the total maximum effective weightage for a respective pre-defined user experience parameter, wherein an applicability index for a pre-defined user experience parameter is indicative of relative importance of the pre-defined user experience parameter with respect to other pre-defined user experience parameters for designing the UI for the application.

9. The user interface designing system as claimed in claim 8, wherein the user selected first answer for a respective pre-defined question is from amongst the first set of pre-defined answers for the respective pre-defined question.

10. The user interface designing system as claimed in claim 9, wherein each of the pre-defined answers in the first set is associated with an STI score with respect to each of the pre-defined user experience parameters based on which the STI weightage is assigned to the user selected first answer, and wherein the STI score of a pre-defined answer is indicative of degree of significance of the corresponding requirement with respect to a pre-defined user experience parameter.

11. The user interface designing system as claimed in claim 8, wherein the user selected second answer for a respective pre-defined question is from amongst the second set of pre-defined answers for the respective pre-defined question.

12. The user interface designing system as claimed in claim 11, wherein each of the pre-defined answers in the second set is associated with an STB score based on which the STB weightage is assigned to the user selected second answer, and wherein the STB score of a pre-defined answer is indicative of degree of significance to business of the UI with respect to the corresponding pre-defined question.

13. The user interface designing system as claimed in claim 8, wherein the pre-defined user experience parameters comprise 'Ease of Use', 'Speed of Use', 'Learnability', 'Consistency', 'Content', 'Accessibility', 'Flexibility', 'Aesthetics', 'Recovery from Errors', and 'Help'.

14. The user interface designing system as claimed in claim 8, wherein the user experience parameter applicability determination module further displays the applicability index of each of the pre-defined user experience parameters to the user for allowing the user to design the UI based on the applicability index.

15. A non-transitory computer-readable medium having embodied thereon a computer program for executing a method comprising:

receiving a first response from a user comprising user selected first answers to pre-defined questions, wherein the pre-defined questions pertain to requirements of user interface (UI) associated with pre-defined user experience parameters, wherein the pre-defined user experience parameters are indicative of user experience for the UI, and wherein a user selected first answer to a respective pre-defined question is indicative of a requirement applicable for the UI with respect to the respective pre-defined question;

receiving a second response from the user comprising user selected second answers to the pre-defined questions, wherein a user selected second answer to a respective pre-defined question is indicative of significance to business of the UI with respect to the respective pre-defined question;

assigning a significance to interface (STI) weightage to each of the user selected first answers with respect to each of the pre-defined user experience parameters, wherein a STI weightage for a user selected first answer with respect to a pre-defined user experience parameter is indicative of degree of significance of a corresponding requirement with respect to the pre-defined user experience parameter;

assigning a significance to business (STB) weightage to each of the user selected second answers, wherein a STB weightage for a user selected second answer to a pre-defined question is indicative of degree of significance to business of the UI with respect to the pre-defined question;

computing total actual effective weightage for each pre-defined user experience parameter, wherein total effective weightage for a respective pre-defined user experience parameter is computed based on the STI weightages of the user selected first answers with respect to the respective pre-defined user experience parameter and the STB weightages of the user selected second answers;

calculating total maximum effective weightage for each pre-defined user experience parameter, wherein the total maximum effective weightage for a respective pre-defined user experience parameter is calculated based on maximum possible STI weightage for a first set of pre-defined answers for each of the pre-defined questions with respect to the respective pre-defined user experience parameter and maximum possible STB weightage for a second set of pre-defined answers for each of the pre-defined questions; and determining an applicability index for each pre-defined user experience parameter based on ratio of the total actual effective weightage to the total maximum effective weightage for a respective pre-defined user experience parameter, wherein an applicability index for a pre-defined user experience parameter is indicative of relative importance of the pre-defined user experience parameter with respect to other pre-defined user experience parameters for designing the UI for an application.

16. The non-transitory computer-readable medium as claimed in claim 15, wherein the user selected first answer for a respective pre-defined question is from amongst the first set of pre-defined answers for the respective pre-defined question, wherein each of the pre-defined answers in the first set is associated with an STI score with respect to each of the pre-defined user experience parameters based on which the STI weightage is assigned to the user selected first answer, wherein the STI score of a pre-defined answer is indicative of degree of significance of the corresponding requirement with respect to a pre-defined user experience parameter.

17. The non-transitory computer-readable medium as claimed in claim 15, wherein the user selected second answer for a respective pre-defined question is from amongst the second set of pre-defined answers for the respective pre-defined question, wherein each of the pre-defined answers in the second set is associated with an STB score based on which the STB weightage is assigned to the user selected second answer, and wherein the STB score of a pre-defined answer is indicative of degree of significance to business of the UI with respect to the corresponding pre-defined question.

18. The non-transitory computer-readable medium as claimed in claim 15, wherein the computing total actual effective weightage for each pre-defined user experience parameter is based on:

$$E_{Actual}^{j}=\Sigma_{i=1}^{n}STI_{i}^{j}*STB_{i}, j\in 1,\ldots,m$$

wherein $E_{Actual}^{j}$ represents total actual effective weightage for $j^{th}$ pre-defined user experience parameter, n represents total number of pre-defined questions, m represents total number of pre-defined user experience parameters, $STI_{i}^{j}$, for $j^{th}$ pre-defined user experience parameter, represents STI weightage of user selected first answer for $i^{th}$ pre-defined question, and $STB_{i}$ represents STB weightage of user selected second answer for the $i^{th}$ pre-defined question.

19. The non-transitory computer-readable medium as claimed in claim 15, wherein the calculating total maximum effective weightage for each pre-defined user experience parameter is based on:

$$E_{Maximum}^{j}=\Sigma_{i=1}^{n}MSTI_{i}^{j}*MSTB_{i}, j\in 1,\ldots,m$$

wherein $E_{Maximum}^{j}$ represents total maximum effective weightage of $j^{th}$ pre-defined user experience parameter, n represents total number of pre-defined questions, m represents total number of pre-defined user experience parameters, $MSTI_{i}^{j}$ represents maximum possible STI weightage for $i^{th}$ pre-defined question with respect to $j^{th}$ pre-defined user experience parameter, and $MSTB_{i}$ represents maximum possible STB weightage for the $i^{th}$ pre-defined question.

20. The non-transitory computer-readable medium as claimed in claim 15 further comprising:

displaying the applicability index of each of the pre-defined user experience parameters to the user for allowing the user to design the UI based on the applicability index.

* * * * *